United States Patent Office 3,748,240
Patented July 24, 1973

3,748,240
SACRIFICIAL ELECTRODE SYSTEM FOR REMOVAL OF HEAVY METAL IONS FROM WASTE WATER
Edward E. Johnson, Sweeny, Ralph N. Buggs, Missouri City, and Richard L. Kornmann, Lake Jackson, Tex., assignors to Nalco Chemical Company, Chicago, Ill.
No Drawing. Filed June 7, 1972, Ser. No. 263,368
Int. Cl. C02c 5/12; C02b 1/82
U.S. Cl. 204—149  7 Claims

ABSTRACT OF THE DISCLOSURE

Method of and cell system for removing heavy metal ions from solution in waste water which consists of electrolyzing and precipitating said ions as acid insoluble sulfides at a pH below 7 utilizing a carbon/carbon electrode pair wherein the cathode (sacrificial) contains 20–80% cathode weight of elemental sulfur. Heavy metal ions forming acid insoluble sulfides include the preferred mercury and silver, lead, cadmium, and copper.

---

The present invention relates to a method and an electrode cell system for the removal of certain heavy metal ions in solution and specially from waste water and the like. This method is applicable for the removal of heavy metal ions which under the invention electrolysis conditions form acid insoluble sulfides. Thus, the heavy metal ions are removed from solution or from the electrolyte during electrolysis and precipitate as sulfides through the novel arrangement of a sacrificial cathode containing elemental sulfur. This invention is particularly applicable to the removal of mercury ions to form mercury sulfide and mercury bisulfide. It is also applicable to heavy metal ions such as silver, lead, cadmium, and copper, among others, which likewise form acid insoluble sulfides which then can be centrifuged or filtered and removed from the system.

PRIOR ART

In the removal of heavy metal ions from solution, the following patents are of interest:

1,119,477 Arsdale—Electrolysis of copper sulfate wherein the amperage is regulated to avoid the formation of sulfides.
1,937,179 Weisberg et al. (Weisberg & Greenwold, Inc.)—Removal of silver ions in the electrolysis of hypo solution using a metal cathode; e.g., stainless steel.
3,051,636 Kaspaul (3M)—Electrolysis of cadmium salts using a consumable or sacrificial cadmium anode and an electrolyte to provide sulfur such as thioacetamide.
3,162,587 Zubryckyj (Sherritt Gordon Mines)—Removal of non-ferrous metal cation in a diaphragm-type cell utilizing acid pH where the sulfide ores are provided in the catholyte.

THE PRESENT INVENTION

In contrast to the prior art, the present invention provides positive advantages in that there is elimination of cathode plating and higher efficiency as well as control of the amount of sulfide ions which go into solution from the cathode. Also, by this process waste effluents containing as much as 100 p.p.m. of heavy metal ions such as mercury can be treated to produce a final concentration of below 5 p.p.b. Finally, the concentration of the produced heavy metal sulfides at or near the cathode provides a concentrated area from which these precipitates can be centrifuged or filtered from the system.

THE ELECTRODE PAIR

A key feature of the present invention for the removal of heavy metal ions is the utilization of a cathode formed from a mix of carbon powder and sulfur powder in the ratio which may range from C:S of 80:20 to 20:80, with a preferred ratio of 50:50 cathode weight. The sulfur weight content present in the cathode provides the sulfur which during electrolysis enables the formation of the insoluble sulfides at or near the cathode. Thus, in a sense, it may be termed a sacrificial or consumable cathode since the sulfur portion is consumable. The sulfur portion is also sacrificial, analogous to known terminology utilized with lead anodes in the so-called "Nalco Freeport Process" for the production of organolead compounds. The cathode may be conveniently prepared by admixing carbon and sulfur powders in a mold which is externally heated for 1–2 hours at a temperature of 150–180° C. and a pressure of 2–5 pounds. At the end of this time, the mass is allowed to cool and the electrode is removed from the mold.

The anode utilized in th carbon/carbon electrode pair system is preferably a so-called phenolic carbon anode. Such anodes are constructed of impervious graphite on which a phenolic impregnant has been used, and in the market place the phenolic impregnated anode material is sold as Karbate 22 (Union Carbide Corporation, Catalog S–5050, page 1). Also utilizable are carbon electrodes where an epoxy impregnant is employed such as are obtainable Karbate 25 (Union Carbide Corporation, Catalog S–5050, page 1). Other useable resin impregnated graphite-type electrodes may contain a furfural based polymer. Related materials are described in:

3,046,216 Lowe (Union Carbide Corporation)—Furfuraldehyde-ketone condensation product.
3,375,132 Geise (Union Carbide Corporation)—Tarry hydrocarbon, furfural, and acid catalyst.
3,072,558 Myers et al. (Dow Chemical Company)—Phenol formaldehyde binder in a composite anode.

PARAMETERS OF CELL OPERATION

In the present invention the applied voltage varies in the type and content of the solution, but in most cases is in the range of about 2–5 volts. Also, the current density is in the range of about 0.025 amp/sq. in. The cell electrolyte is maintained on the acid pH side or below 7. This restriction of an acid pH in the operation of the cell system for this method or process is due to the fact that if the electrolyte is basis, as with precipitating mercury, the hydroxy ions may react with the sulfur in the electrode to form polysulfides and damage or destroy the electrode.

EXAMPLE 1

A "beaker cell" was constructed by inserting a 50:50 carbon sulfur cathode (3" in diameter and ¼" thick) into a beaker or container. A ¼" carbon rod anode which was 4" in length was also inserted into the beaker. A 300 ml. sample of solution having from 1–1000 p.p.m. of heavy metal ion was poured into the cell. The pH of the electrolyte in the cell was maintained at less than 7.0 and a D.C. Kepco Power Supply was used to apply a voltage to the beaker cell. Some experimental data utilized in connection with several runs of this example is set out below.

| Initial conc. | Current (amp) | pH | Time (min.) | Final conc. |
|---|---|---|---|---|
| 4.0 p.p.m. Hg | 0.1 | 3.0 | 5 | 2.0 p.p.m. |
| 100.0 p.p.m. Pb | 0.1 | 3.0 | 1 | 22.0 p.p.m. |
| 100.0 p.p.m. Pb | 0.1 | 3.0 | 3 | 2.0 p.p.m. |
| 100.0 p.p.m. Cu | 0.1 | 3.0 | 1 | 20.0 p.p.b. |
| 4.9 p.p.m. Hg | 0.1 | 3.0 | 10 | 4.2 p.p.b. |
| 4.9 p.p.m. Hg | 0.05 | 3.1 | 5 | 5.2 p.p.b. |
| 17.0 p.p.m. Hg | 0.1 | 3.0 | 15 | 2.9 p.p.b. |
| 9.7 p.p.m. Hg | 0.05 | 3.5 | 3 | 40.0 p.p.b. |
| 9.7 p.p.m. Hg | 0.05 | 3.5 | 5 | 68.0 p.p.b. |

EXAMPLE 2

In a manner similar to the procedure of Example 1 using a 50:50 carbon:sulfur cathode and a phenolic carbon anode, the pH was adjusted to 4.5 with concentrated HCl buffered with acetic acid/sodium acetate. A 300 ml. sample of input from a waste water stream containing 17 p.p.m. of mercury was electrolyzed using .1 ampere and 2.0 volts applied current. After 15 minutes, the solution was filtered and a remaining mercury content was measured as 2.9 p.p.b.

EXAMPLE 3

In a manner similar to Example 2, 300 ml. of a waste stream containing 9.7 p.p.m. of mercury was adjusted to a pH of 3.0 with concentrated HCl. An electrode system consisting of carbon/carbon-sulfur (using a 50:50 mix) sacrificial cathode was utilized and the power supply and amperage was the same as Example 2. After 123 minutes of electrolysis time, the solution was filtered and mercury in the filtrate was measured as 2.4 p.p.b.

EXAMPLE 4

Experimental parameters were similar to Example 2 except that the current density was maintained at 0.05 amp. After 111 minutes of electrolysis, solution was filtered and the product contained 4.2 p.p.b. The residue or precipitant contained 9.6 p.p.m.

EXAMPLE 5

In a procedure similar to Experiment 2, an input from Detrex pond water of 4.9 p.p.m. of mercury was electrolyzed utilizing 2.4 volts (applied) and a current density of .1 amp. After 10 minutes, the filtrate was analyzed as 4.2 p.p.b. of mercury. The residue was measured by adding $Br_2$ to the filtrate and heating to drive off $H_2S$ and measured 4.8 p.p.m.

EXAMPLE 6

Using input Detrex pond water containing 4.9 p.p.m. Hg as in Example 5 and utilizing about 2.0 applied voltage and 0.05 amp current density, after 15 minutes the mercury content was reduced to 5.2 p.p.b. while the pH was maintained at about 3.1.

The embodiments of this invention in which an exclusive property or privilege is claimed are defined as:

1. A method of removing heavy metal ions in solution from waste water by precipitating said ions at a pH below 7 as an acid insoluble sulfide which comprises electrolyzing said ions in a carbon/carbon electrode cell system wherein the carbon cathode has integrally incorporated therein about 20-80% cathode weight of elemental sulfur.

2. The method of claim 1 wherein the heavy metal ion is selected from mercurous and mercuric ions which are precipitated as mercury sulfide and mercury bisulfide.

3. The method of claim 1 wherein the carbon cathode has integrally incorporated therein about 50% cathode weight of elemental sulfur and the anode is resin bonded carbon.

4. The method of claim 1 wherein the voltage applied while electrolyzing is in the range of about 2 to 5 volts and the current density is in the range of about 0.025 amp/sq. in.

5. An electrode cell system for cathode recovery of heavy metals which utilizes a carbon/carbon potential wherein the cathode contains integrally 20-80% of elemental sulfur by cathode weight, an acid aqueous electrolyte maintained at a pH of less than 7.0 and wherein said system is operated at an applied voltage of about 2 to 5 volts and a current density of about 0.25 amp/sq. in.

6. The cell system according to claim 5 wherein the cathode contains a ratio of carbon:sulfur of about 50:50 by cathode weight percent.

7. The cell system according to claim 5 wherein the electrolyte is HCl buffered with HOAc+NaOAc.

References Cited

UNITED STATES PATENTS

| | | | |
|---|---|---|---|
| 1,146,942 | 7/1915 | Landreth | 204—149 |
| 2,199,767 | 5/1940 | Wells et al. | 204—149 X |
| 2,783,184 | 2/1957 | Miller | 204—130 X |
| 3,616,356 | 10/1971 | Roy | 204—152 |

JOHN H. MACK, Primary Examiner

A. C. PRESCOTT, Assistant Examiner

U.S. Cl. X.R.

204—92, 130

UNITED STATES PATENT OFFICE
CERTIFICATE OF CORRECTION

Patent No. 3,748,240     Dated July 24, 1973

Inventor(s) EDWARD E. JOHNSON et al

It is certified that error appears in the above-identified patent and that said Letters Patent are hereby corrected as shown below:

Column 4, line 25 for "0.25" read -- .025 --

Signed and sealed this 20th day of November 1973.

(SEAL)
Attest:

EDWARD M. FLETCHER, JR.
Attesting Officer

RENE D. TEGTMEYER
Acting Commissioner of Patents